US012573938B2

(12) United States Patent
Mercier et al.

(10) Patent No.: US 12,573,938 B2
(45) Date of Patent: Mar. 10, 2026

(54) CHARGE RECYCLING CIRCUIT AND METHOD FOR DC-DC CONVERTERS

(71) Applicant: The Regents of the University of California, Oakland, CA (US)

(72) Inventors: Patrick Mercier, San Diego, CA (US); Abdullah Abdulslam, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 298 days.

(21) Appl. No.: 18/252,607

(22) PCT Filed: Nov. 16, 2021

(86) PCT No.: PCT/US2021/059465
§ 371 (c)(1),
(2) Date: May 11, 2023

(87) PCT Pub. No.: WO2022/108906
PCT Pub. Date: May 27, 2022

(65) Prior Publication Data
US 2024/0030800 A1 Jan. 25, 2024

Related U.S. Application Data

(60) Provisional application No. 63/115,240, filed on Nov. 18, 2020.

(51) Int. Cl.
*H02M 1/00* (2007.01)
*H02M 3/07* (2006.01)
*H02M 3/158* (2006.01)

(52) U.S. Cl.
CPC ........... *H02M 1/0054* (2021.05); *H02M 3/07* (2013.01); *H02M 3/158* (2013.01)

(58) Field of Classification Search
CPC ...... H02M 1/0054; H02M 3/07; H02M 3/158; H02M 1/0095; H02M 7/538;
(Continued)

(56) References Cited

U.S. PATENT DOCUMENTS

| | | | | |
|---|---|---|---|---|
| 2006/0227861 A1* | 10/2006 | Maksimovic | .......... | H03K 5/133 375/238 |
| 2012/0062190 A1* | 3/2012 | Haiplik | ................ | H02M 3/156 327/109 |
| 2015/0311884 A1* | 10/2015 | Saadat | .................. | H03K 3/012 327/109 |
| 2016/0118887 A1* | 4/2016 | Zhang | ................ | H02M 7/4837 323/271 |

(Continued)

OTHER PUBLICATIONS

Abdulslam, et al., "A Continuous-Input-Current Passive-Stacked Third-Order Buck Converter Achieving 0.7W/mm2 Power Density and 94% Peak Efficiency", 2019, ISSCC, Session 8, DC-DC Converters, pp. 148-150.

(Continued)

*Primary Examiner* — Thienvu V Tran
*Assistant Examiner* — Jonathan Walter Soileau
(74) *Attorney, Agent, or Firm* — Greer, Burns & Crain, Ltd.; Steven P. Fallon

(57) ABSTRACT

A charge recycling circuit in an integrated circuit DC-DC converter having two power MOSFETs, the charge recycling circuit comprising a single inductor and recycling MOSFET switches arranged and sized such that when one of the two power MOSFETs is turning off, its gate capacitance charges are transferred to the single inductor, stored in the single inductor and then transferred directly to the gate of the other power MOSFET to turn it on.

17 Claims, 20 Drawing Sheets

(58) Field of Classification Search
CPC ............. H02M 1/0048; H02M 3/1582; H02M
7/4837; H02M 7/483; H02M 3/156;
H02M 1/0029; H02M 3/155–1588; Y02B
70/10; H03K 3/012
See application file for complete search history.

(56) References Cited

U.S. PATENT DOCUMENTS

2019/0089263 A1*   3/2019  Granato ............ H02M 3/33573
2019/0222108 A1*   7/2019  Xu .......................... B60L 50/51

OTHER PUBLICATIONS

Abdulslam, et al., "A 98.2%-Efficiency Reciprocal Direct Charge Recycling Inductor-First DC-DC Converter", 2021, ISSCC, Session 17, DC-DC Converters, pp. 264-266.

Jia, et al., "A 0.3-0.86V Fully Integrated Buck Regulator with 2GHz Resonant Switching for Ultra-Low Power Applications", 2017, Symposium on VLSI Circuits Digest of Technical Papers, pp. C208-C209.

Liu, et al., "A 94.2%-Peak-Efficiency 1.53A Direct-Battery-Hook-Up Hybrid Dickson Switched-Capacitor DC-DC Converter with Wide Continuous Conversion Ratio in65nm CMOS", ECE Illinois, University of Illinois at Urbana-Champaign Department of Electrical and Computer Engineering, Powerpoint.

Mulligan, et al.., "A 3MHz Low-Voltage Buck Converter with Improved Light Load Efficiency", 2007, ISSCC, Session 29, Analog and Power Management Techniques, pp. 528-530.

Wei, et al., "A Direct 12V/24V-to-1V 3W 91.2%-Efficiency Tri-State DSD Power Converter with Online VCF Rebalancing and In-Situ Precharge Rate Regulation", 2020, ISSCC, Session 11, DC-DC Converters, pp. 190-192.

International Search Report from the corresponding International Patent Application No. PCT/US2021/059465, dated Jan. 11, 2022.

* cited by examiner

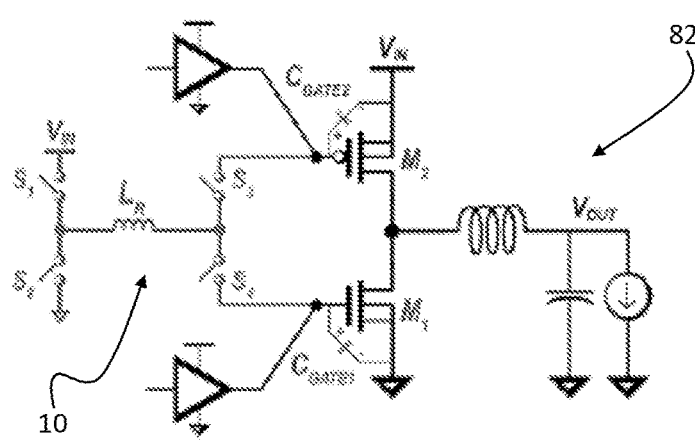
FIG. 8A
Driver with
bootstrapping
capacitor
FIG. 8B
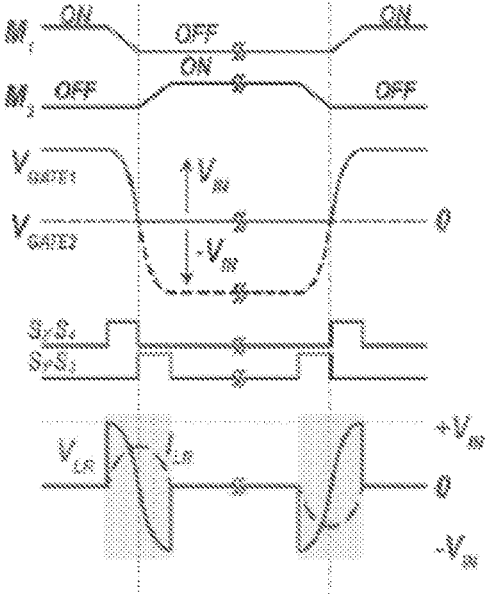
FIG. 8C

CHARGE RECYCLING CIRCUIT AND METHOD FOR DC-DC CONVERTERS

PRIORITY CLAIM AND REFERENCE TO RELATED APPLICATION

The application claims priority under 35 U.S.C. § 119 and all applicable statutes and treaties from prior U.S. provisional application Ser. No. 63/115,240 which was filed Nov. 18, 2020.

FIELD

Fields of the invention are DC-DC converters and integrated circuits. Methods and circuits of the invention are applicable to any product that utilizes an inductive DC-DC converter, which essentially covers a wide-range of applications starting from personal electronics to automotive and industrial electronics.

BACKGROUND

The losses related to the power MOSFETs in inductive DC-DC and other DC-DC converters are a main contributor to the total converter losses and play an important role in determining the power conversion efficiency. Each power MOSFET has its intrinsic on-resistance $R_{ON}$ causing conduction loss that is inversely proportional to the MOSFET width (W). In addition, each power MOSFET has also switching loss related to the charging/discharging of its gate capacitance ($C_{GATE}$) and this loss increases linearly with W. For a given load current, there is an optimum W that results in minimum losses but this optimum W changes as the load current ($I_L$) changes. There is no certain design choice of W that can give minimum losses for a wide range of load cur-rents. Therefore, the design of inductive DC-DC converters is fundamentally limited by this trade-off between conduction losses and switching losses.

Miniaturized converters used in applications such as mobile devices suffer badly from this trade off, as a small inductor has a large DCR (DC resistance), which contributes larger $I_L^2$DCR conduction losses, while a small inductance desires high frequency operation, which implies higher $C_{GATE}V^2F_{SW}$ hard charging switching losses from the power MOSFET gate drivers. The rise/fall time of such drivers cannot be too rapid, regardless of switching frequency, due to inductive ringing causing potential voltage stresses. See, K. Wei et al., "A Direct 12V/24V-to-1V 3W 91.2%-Efficiency Tri-State DSD Power Converter with Online VCF Rebalancing and In-Situ Precharge Rate Regulation," ISSCC, 2020; W. Liu et al., "A 94.2%-peak-efficiency 1.53 A direct-battery-hook-up hybrid Dickson switched-capacitor DC-DC converter with wide continuous conversion ratio in 65 nm CMOS," ISSCC, 2017. One hard-switching $3^{rd}$ order buck converter used two power transistors $M_1$ and $M_2$, with the gates of $M_1$ and $M_2$ switching with amplitude $V_{IN}$ above and below $V_{OUT}$, respectively. $M_1$ and $M_2$ are hard-switched through flying inverter-based drivers. See, A. Abdulslam et al., "A Continuous-Input-Current Passive-Stacked Third-Order Buck Converter Achieving 0.7 W/mm² Power Density and 94% Peak Efficiency," ISSCC, 2019.

To ease the conduction/switching loss trade-off, it is possible to exploit the requirement for finite rise/fall time by replacing conventionally hard-switching gate drivers with adiabatic charge-recycling (CR) gate drivers. Charge recy-cling can, through the help of an inductor, recycle the charge stored on a gate capacitor of the power transistor to an additional storage capacitor (and vice-versa), theoretically with 100% efficiency.

This approach was demonstrated in M. Mulligan et al., "A 3 MHz Low-Voltage Buck Converter with Improved Light Load Efficiency," ISSCC, 2007. In the converter described in that paper, charge on the power MOSFET gates is recycled to two auxiliary capacitors through two separate inductors. One downside is the overhead of two inductors. Another drawback is that recycling with separate storage capacitors introduces indirect losses, while the separated duty-cycled resonate gate drivers makes non-overlap timing control between power MOSFETs difficult.

AC-coupling the power NMOS to the resonant gate driver can reduce the number of resonant inductors to 1. Jia, J. Gu, "A 0.3-0.86V Fully Integrated Buck Regulator with 2 GHz Resonant Switching for Ultra-Low Power Applications," VLSI, 2017. However, the non-overlap time cannot be precisely controlled, leading to potentially large overlap losses, and limited duty-cycle control through driver slope modulation prevents robust regulation across a wide output range.

SUMMARY OF THE INVENTION

A preferred embodiment provides charge recycling circuit in an integrated circuit DC-DC converter having two power MOSFETs, the charge recycling circuit comprising a single inductor and recycling MOSFET switches arranged and sized such that when one of the two power MOSFETs is turning off, its gate capacitance charges are transferred to the single inductor, stored in the single inductor and then transferred directly to the gate of the other power MOSFET to turn it on.

A preferred method for charge recycling in a DC-DC converter including two power MOSFETs connected to a converter output includes transferring gate capacitance charges from one of the two power MOSFETs when it is turning off to an inductor. When the gate capacitance charges of the one of the two power MOSFETs is depleted, trans-ferring charge stored in the inductor to the gate of the other power MOSFET to turn it on. The charge transfer through the inductor is reveres when the other power MOSFET is turning off, wherein the charge transfers through the induc-tor are interspersed with normal operations of the converter to convert a DC input voltage to a DC output voltage.

BRIEF DESCRIPTION OF THE DRAWINGS

FIGS. 8A-8C show the present charge recycling circuit applied to a buck converter.

DETAILED DESCRIPTION OF THE PREFERRED EMBODIMENTS

A preferred embodiment provides a charge recycling circuit and method for inductive DC-DC converters that enables direct, reciprocal recycling of gate charge from one power MOSFET to another by the addition of only a single inductor and switches, all without affecting converter operation or control and while ensuring non-overlap conditions. The preferred circuit and method greatly relax the fundamental trade-off between conduction losses and switching losses in inductive DC-DC converters enabling overall higher power density and/or higher efficiencies specially at low load current range. An implemented prototype of a converter circuit of the invention achieves a peak efficiency of 98.2%, a peak power density of 0.72 W/mm², and efficiency of 88.4% down to 1% of the maximum load current.

Compared to prior charge recycling approaches in DC-DC converters, the present recycling circuit and method requires only one inductor resulting in a smaller charge recycling circuit. The present circuit and method achieve direct reciprocal charge recycling between power MOSFETs themselves, resulting in a higher charge recycling efficiency, which does not interfere with normal operation or control of the converter. In preferred embodiments, when a power MOSFET is turning off, its gate capacitance charges are transferred to an inductor. These charges stored in the inductor are then transferred directly to the gate capacitance of the other power MOSFET to turn it on.

Preferred embodiments of the invention will now be discussed with respect to experiments and drawings. Broader aspects of the invention will be understood by artisans in view of the general knowledge in the art and the description of the experiments that follows.

Figures 1A, 1B:
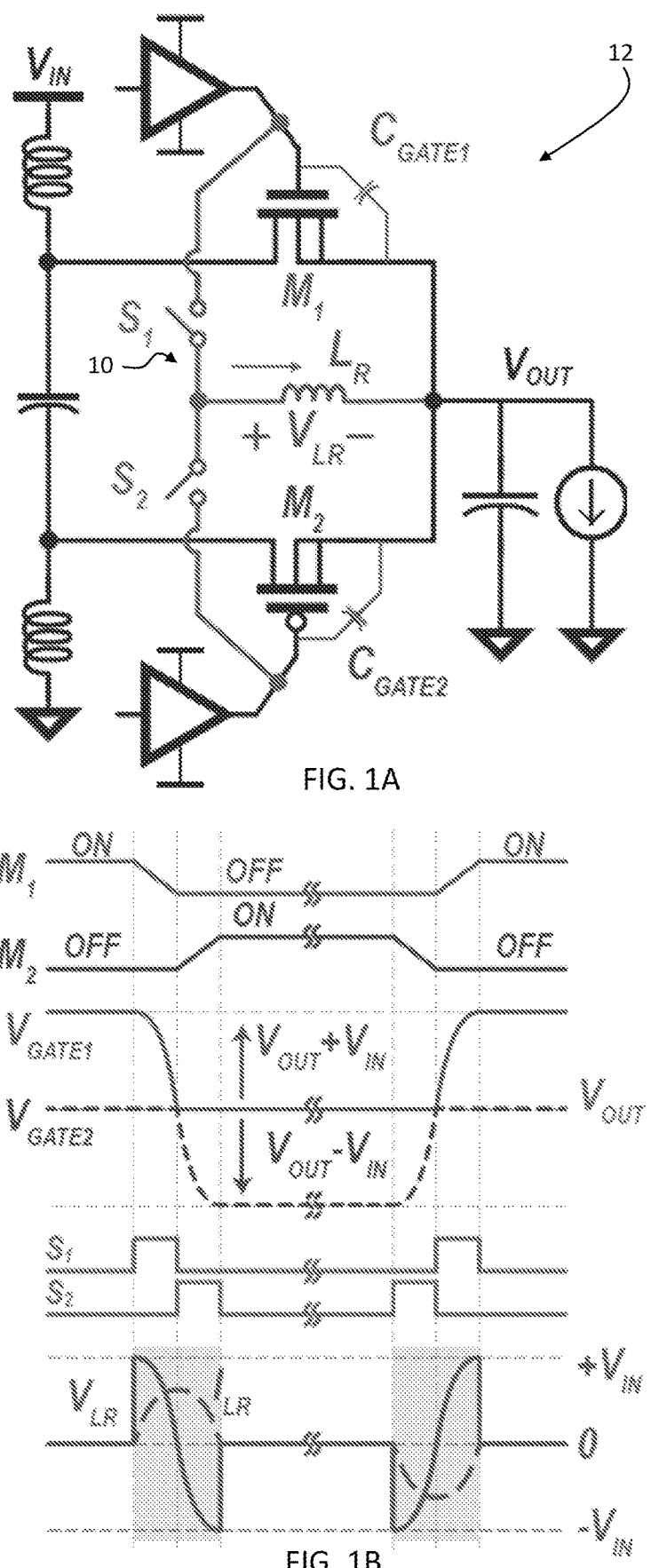
FIGS. 1A and 1B illustrate a preferred direct reciprocal charge recycling circuit and method applied to an inductor-first $3^{rd}$ order buck converter, with FIG. 1A showing a conceptual circuit diagram and FIG. 1B showing waveforms of the circuit.

FIGS. 1A and 1B illustrate a preferred direct reciprocal charge recycling circuit 10 and method applied to an inductor-first $3^{rd}$ order buck converter 12. The reciprocal charge recycling circuit 10 consists of switches $S_1$ and $S_2$ and inductor $L_R$ connected as shown to gates of the power switches $M_1$ and $M_2$. $V_{GATE1}$ of $M_1$ switches with amplitude $V_{IN}$ above $V_{OUT}$, and $V_{GATE2}$ switches with amplitude $V_{IN}$ below $V_{OUT}$, as shown in FIG. 1B. Rather than hard switching $M_1$ and $M_2$ through flying inverter-based driver, the direct reciprocal charge recycling circuit 10 first asserts switch $S_1$ to charge recycling inductor $L_R$ via gate charge stored on the gate of $M_1$ until $C_{GATE1}$ is fully depleted. This is the state when $V_{GATE1}=V_{OUT}$, $V_{LR}=0$ and $I_{LR}$ is at its maximum value. At this point, $S_1$ turns off and $S_2$ is asserted using energy stored in the inductor $L_R$ to charge $C_{GATE2}$; the reverse order of operation occurs when $M_2$ is turned off, which provides direct reciprocal charge recycling between the power transistors $M_1$ and $M_2$.

Figure 1C:
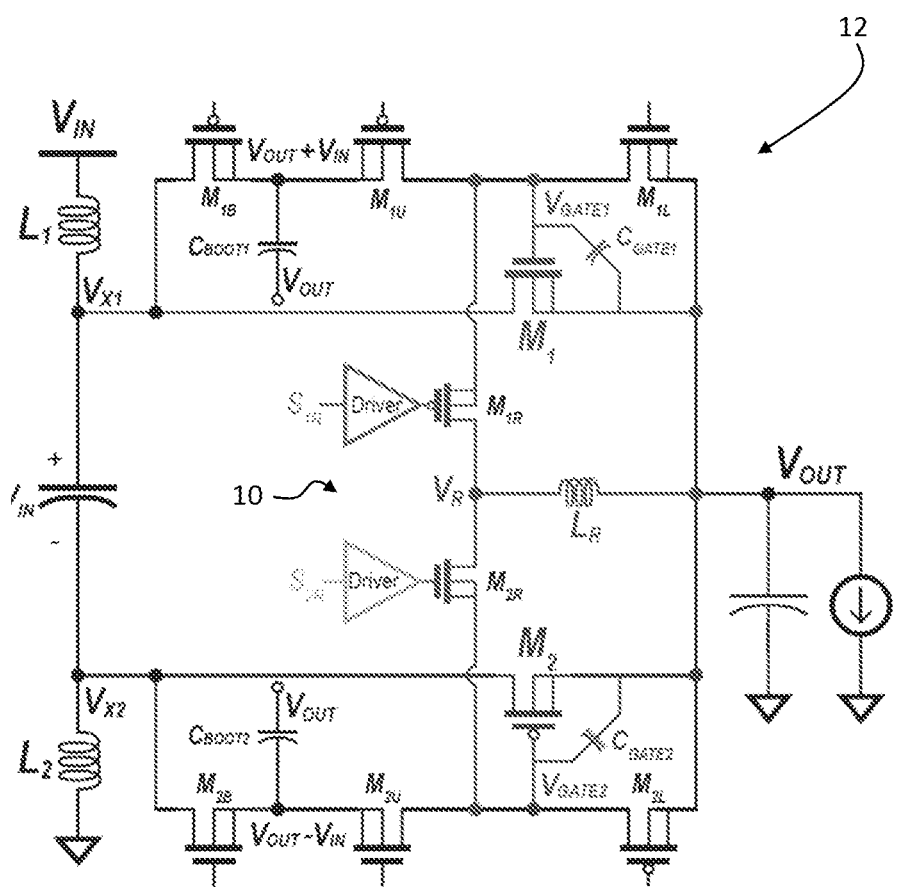
FIG. 1C shows a preferred schematic circuit for the direct reciprocal charge recycling circuit and method applied to an inductor-first $3^{rd}$ order buck converter of FIG. 1A.

FIG. 1C shows a preferred detailed schematic of the direct reciprocal charge recycling circuit 10 and the inductor-first $3^{rd}$ order buck converter 12. During normal operation of the $3^{rd}$ order buck converter 12, $M_1$ and $M_2$ switch with duty cycle D, leading $V_{X1}$ to switch between $V_{OUT}$ and ($V_{OUT}+V_{IN}$), and $V_{X2}$ to switch between ($V_{OUT}-V_{IN}$) and $V_{OUT}$. Inductor volt-second balancing then ensures that the flying capacitor is balanced at $V_{IN}$ and that $V_{OUT}=DV_{IN}$. Two bootstrapping capacitors $C_{BOOT1,2}$ are used to internally generate two level-shifted rail voltages $V_{OUT}+V_{IN}$ and $V_{OUT}-V_{IN}$ that are used to drive $M_1$ and $M_2$, which turn ON by connecting their gate terminals to $C_{BOOT1}$ and $C_{BOOT1}$ through charge-recycling transistors/switches $M_{1U}$ and $M_{2U}$. They turn OFF by dumping their gate charges to the $V_{OUT}$ node through $M_{1L}$ and $M_{2L}$. Thus, there gates are nominally hard charged with a swing of $V_{IN}$.

To instead recycle the gate charges of $M_1$ and $M_2$, the inductor $L_R$ is connected, and can be formed by a small PCB-trace placed between $V_{OUT}$ and an internal node VR. As seen in FIG. 1C, this only requires a single additional pin on the power management integrated circuit that is the inductor-first $3^{rd}$ order buck converter 12. In FIG. 1C, VR is connected to the gate of power MOSFETS $M_1$ and $M_2$ through charge recycling MOSFETS $M_{1R}$ and $M_{2R}$ to form a charge recycling loop including $C_{GATE1}$ and $C_{GATE2}$, with $M_{R1}$ implemented as PMOS and $M_{Rs}$ implemented as NMOS. Because there are a minimal number of passive and active components introduced by the charge recycling loop, which consist of the one inductor $L_R$ and the switch/charge recycling transistors $M_{1R}$ and $M_{2R}$, the total parasitic resistance of the direct reciprocal charge recycling circuit 10 is low and can provide a charge recycling efficiency on the order of 80%.

Figure 2A:
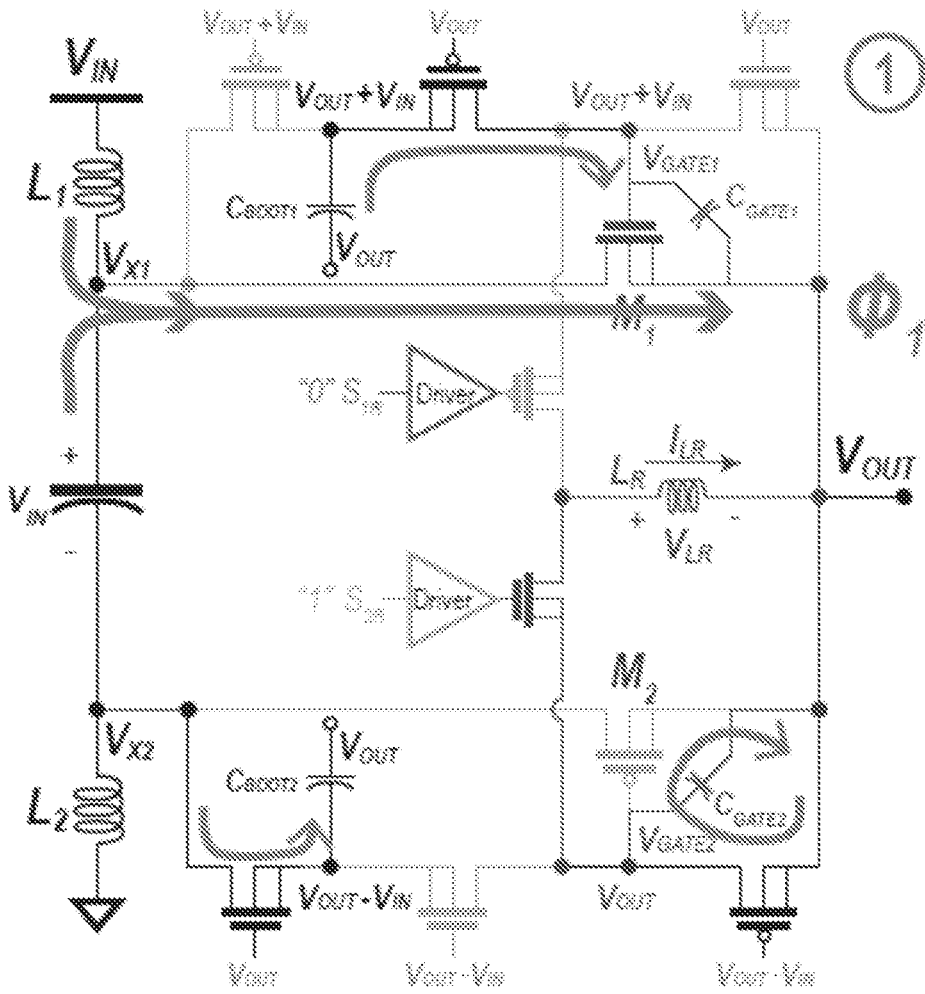
FIGS. 2A-2F illustrate six states of operation for the converter with direct reciprocal charge recycling circuit.
Figure 2B:
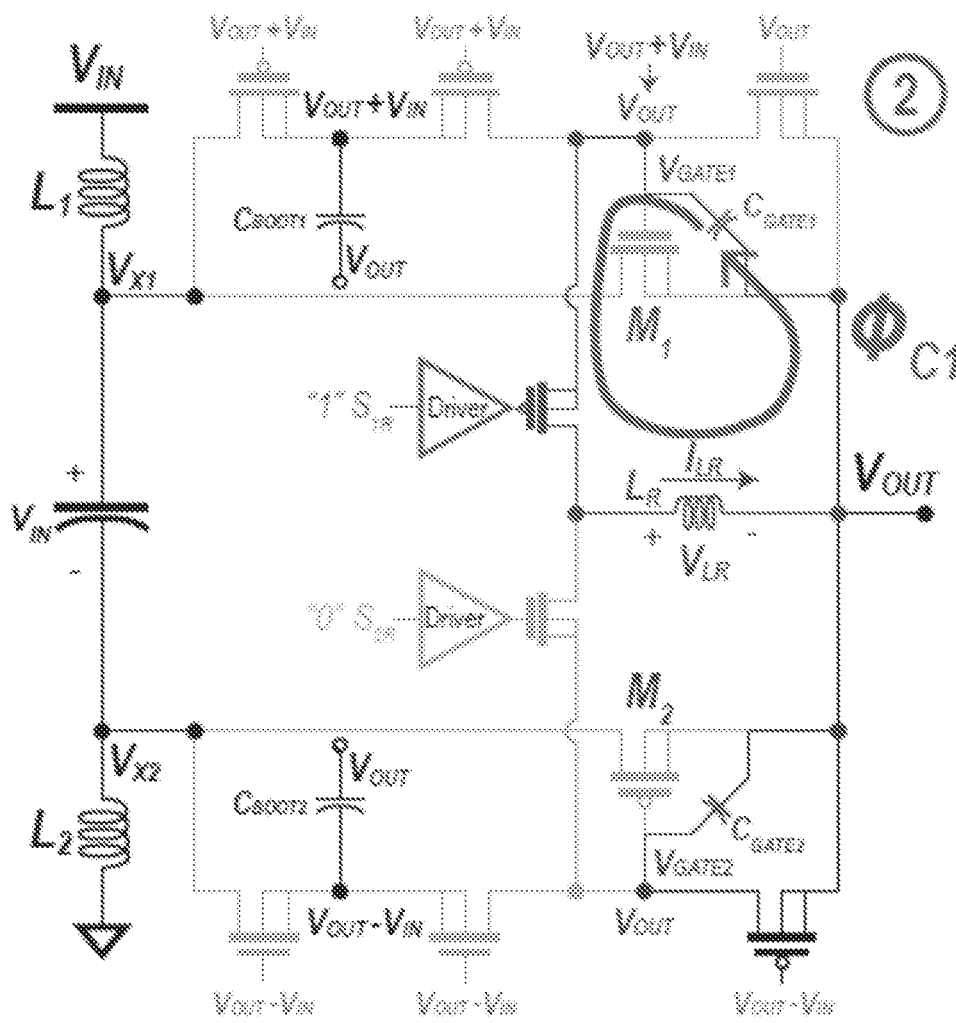
Figure 2C:
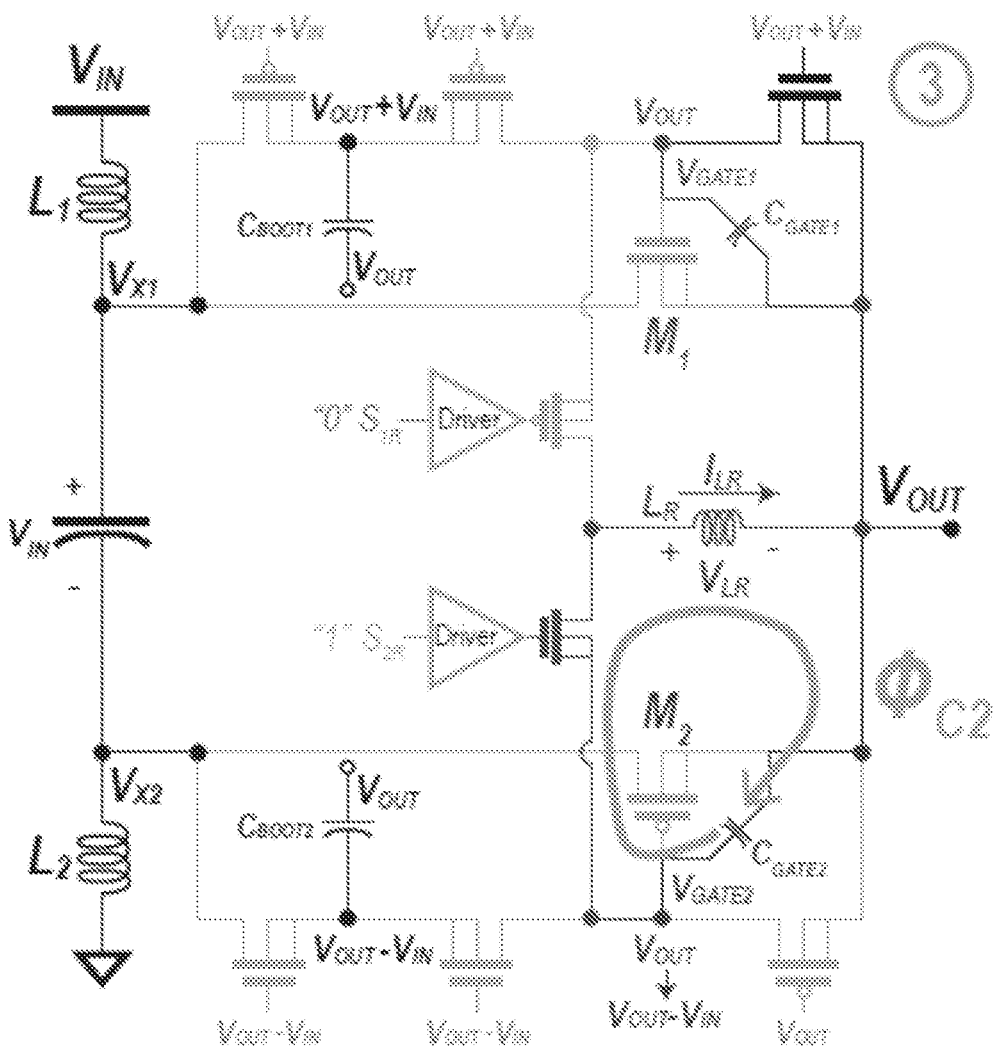
Figure 2D:
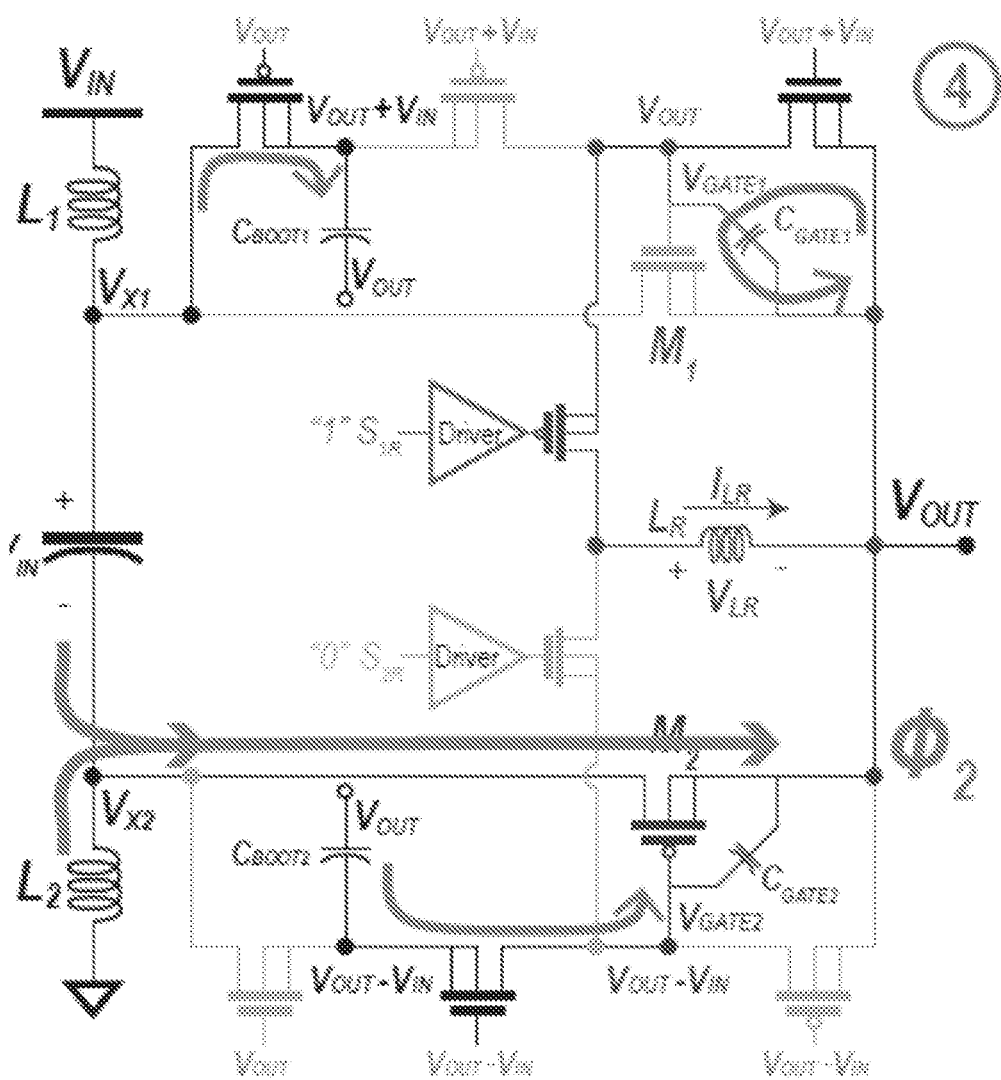
Figure 2E:
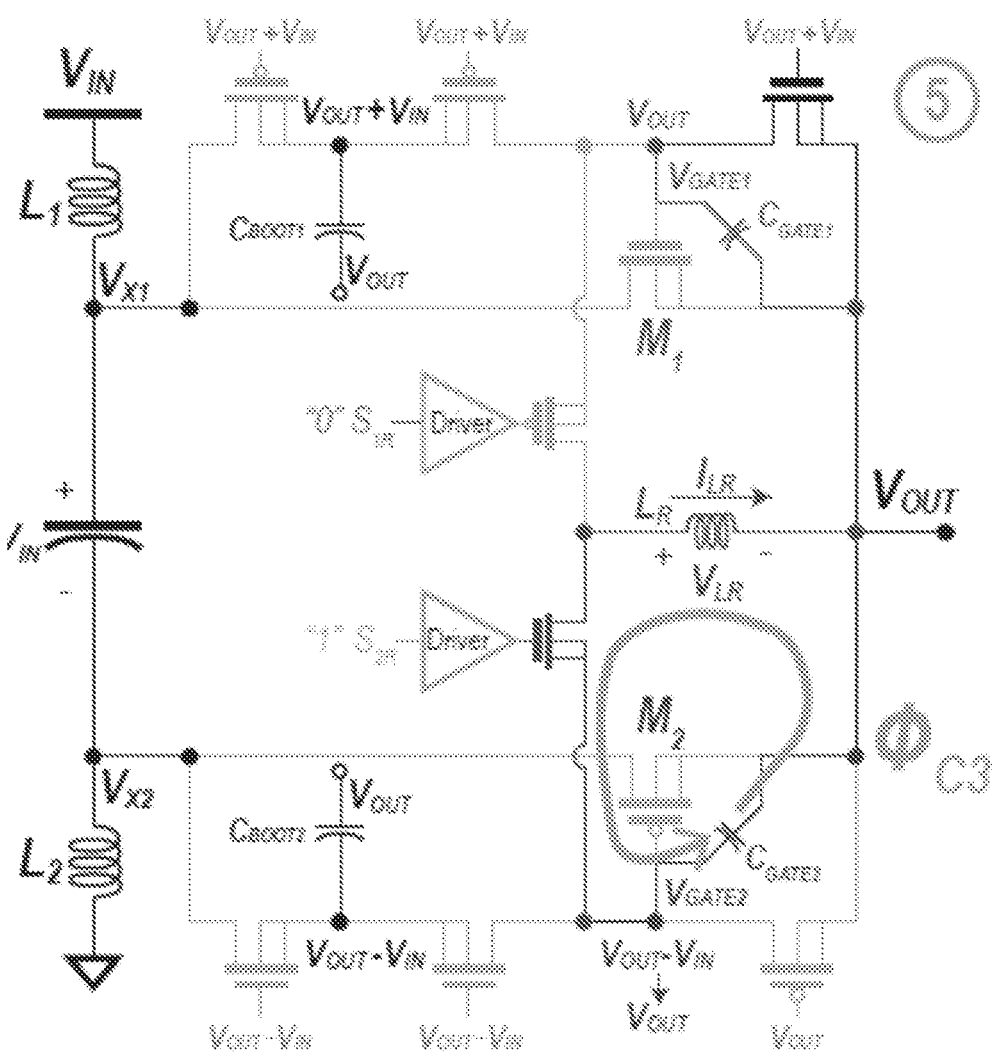
Figure 2F:
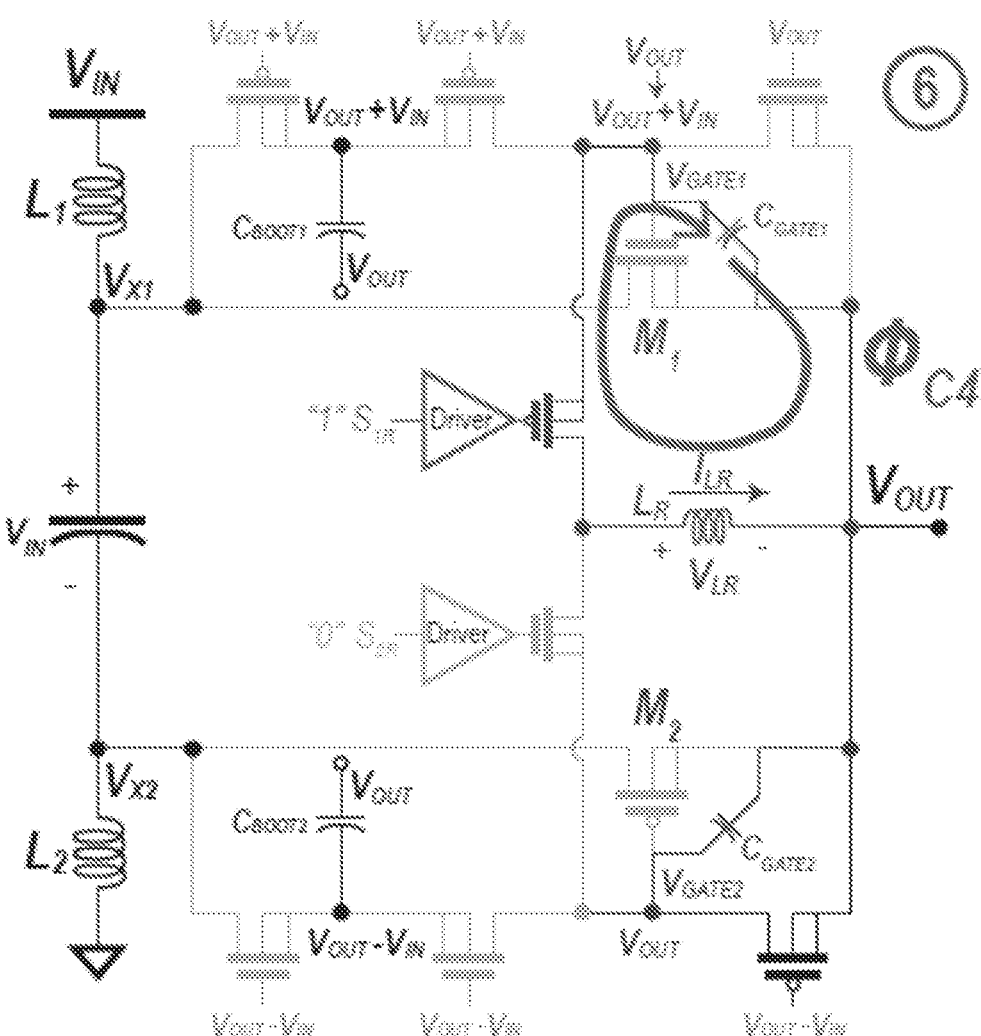
Figure 2G:
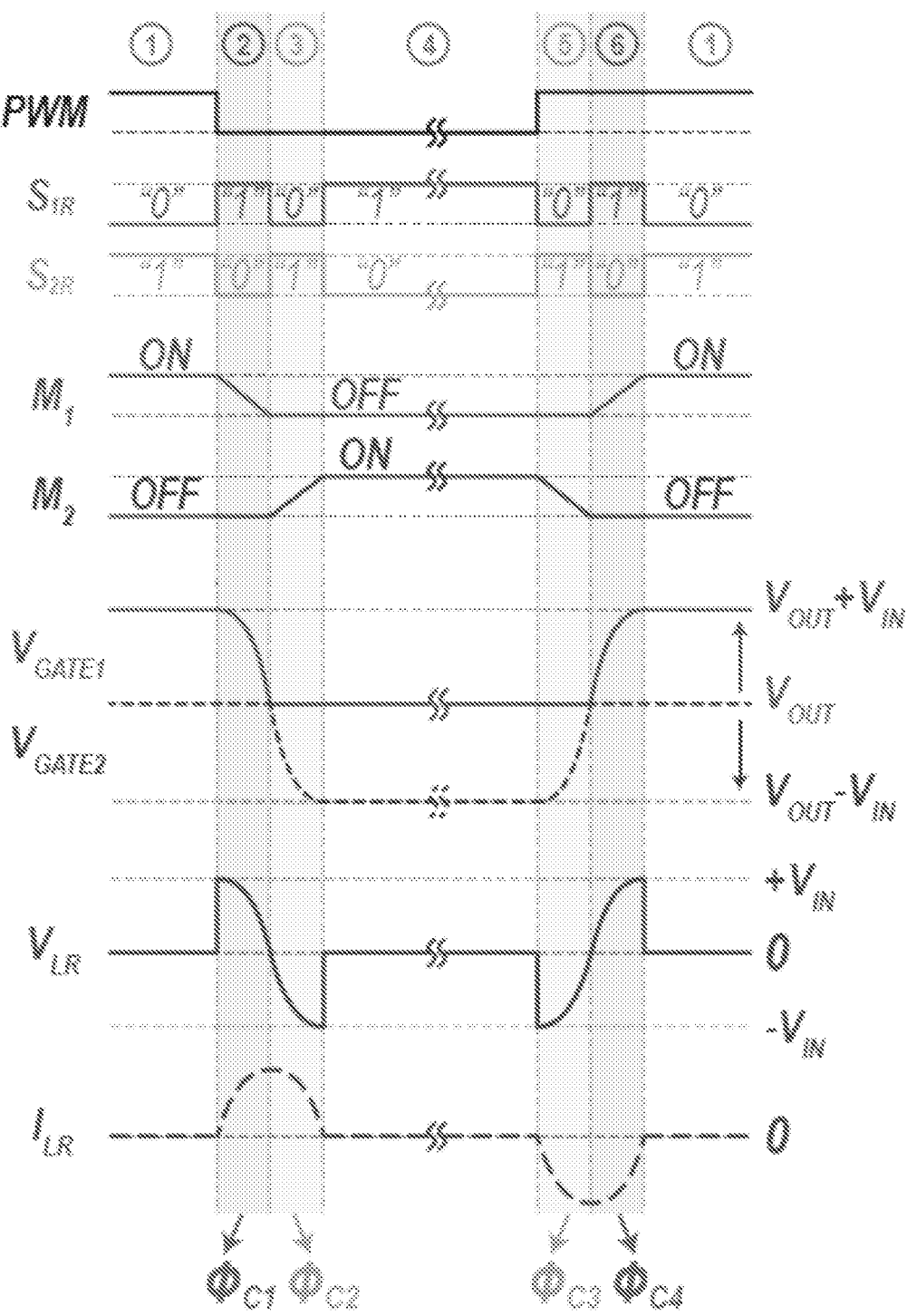
FIG. 2G shows wave forms of the FIGS. 2A-2F opera-tional states of the converter with the reciprocal charge recycling circuit.

FIGS. 2A-2F illustrate six states of operation for the direct reciprocal charge recycling circuit with respect to converter operation, illustrating that the charge recycling can be applied on top of normal converter operations. FIG. 2G shows wave forms of the FIGS. 2A-2F operational states, which include 2 normal conversion states and two recycling states. When $M_1$ is normally ON, its gate is tied to ($V_{OUT}+V_{IN}$) through $M_{1U}$. When $M_1$ beings to turn off $M_{1U}$ is deactivated and $M_{1R}$ is activated so that $C_{GATE1}$ discharges completely into $L_R$. Then the regular gate drivers are activated to tie the power MOSFET gate terminals to the appropriate voltages, while $M_{1R}$ is turned on to discharge any residue charges in $L_R$ that might occur due to imperfect control timing. The same process can be applied when $M_2$ turns OFF to recycle the charge back from $C_{GATEs}$ to $C_{GATE1}$. The charge recycling adds four phases of relatively small duration to the converter's 12 basic operation phases without interfering with the converter's 12 normal operation.

Charge recycling efficiency represents that percentage of the power MOSFET gate charges that was recycled and not dissipated when the power MOSFETs are changing states. The recycling efficiency ($\eta_R$) can be defined as:

$$\eta_R = 1 - \frac{P_{SW,Recycle}}{P_{SW,Hard}} = 1 - \frac{P_{SW,Recycle}}{(C_{GATE1} + C_{GATE2})V_{IN}^2 F_{SW}} \qquad (1)$$

where $P_{SW,Recycle}$ is the total gate drive losses when recycling is applied, $P_{SW,Hard}$ is the gate drive losses without recycling, i.e., hard charging/discharging of the gate capacitance. $F_{SW}$ is the switching frequency, and $C_{GATE1} + C_{GATE2}$ are the respective gate capacitances of the power transistors $M_1$ and $M_2$.

Figure 3A:
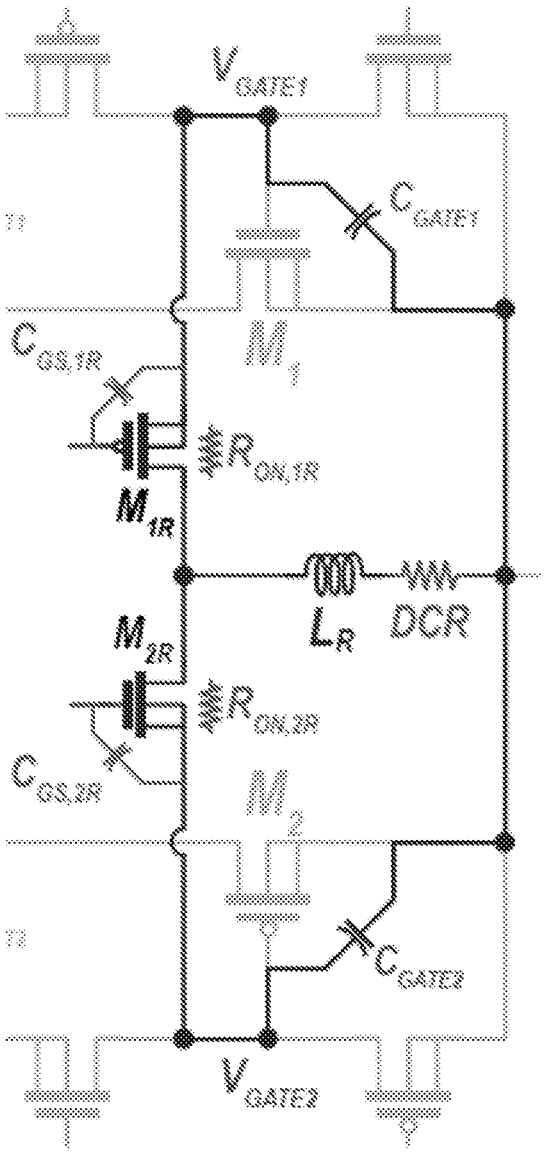
FIG. 3A illustrates parasitics of the charge recycling loop.

FIG. 3A illustrates parasitics of the charge recycling loop (showing only the charge recycling loop portion of the circuit), which are introduced by the inductor $L_R$ and the switch/charge recycling transistors $M_{1R}$ and $M_{2R}$. The parasitics primarily include the equivalent DCR the inductor and the switching, as well as the conduction losses of the recycling MOSFETs. These parasitics can degrade charge recycling efficiency. This can be mitigated by increasing the size of the inductor $L_R$, with which increasing size recycles a larger amount of charge and provides lower RMS current in the recycle loop. This can reduce gate driver losses and improve CR efficiency.

Figure 3B:
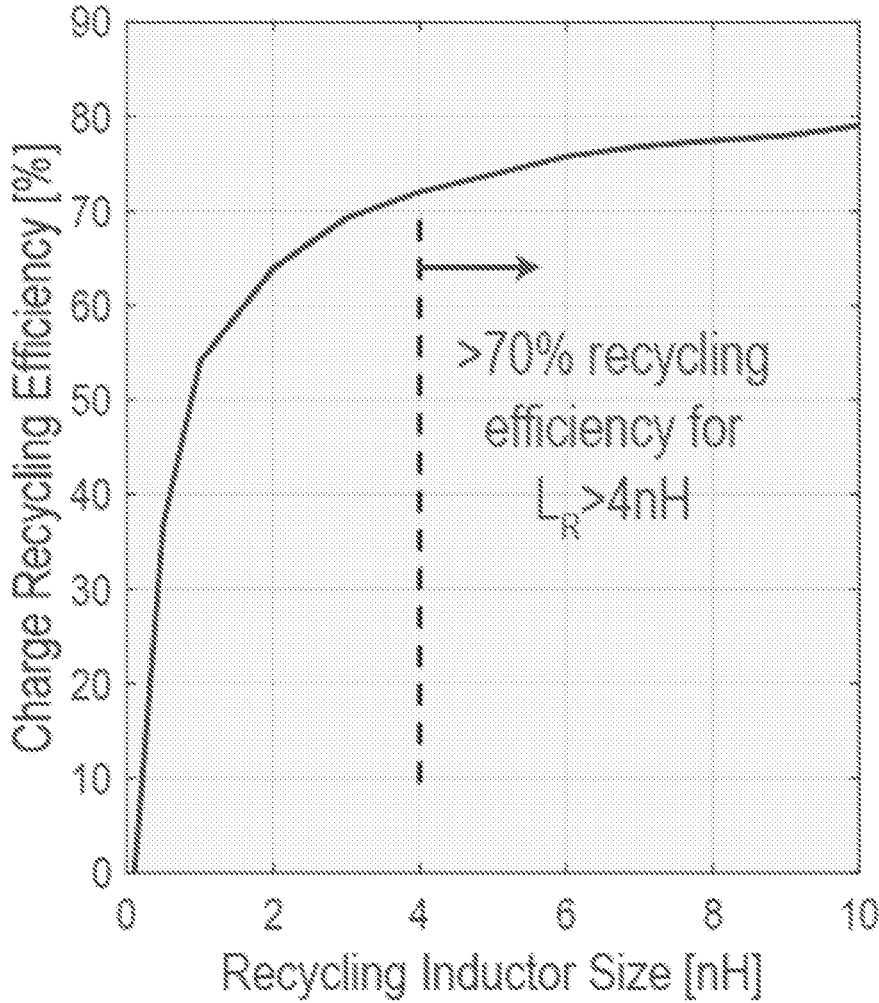
FIG. 3B shows a curve of charge recycling efficiency versus recycling inductor size.

FIG. 3B shows a curve of charge recycling efficiency versus recycling inductor size. As seen the curve, >70% recycling efficiency is realized for >4 nH recycling inductors. The data is for 50 mΩ DCR, $C_{GATE1,2}$=200 pF. Including the conduction and switching losses of $M_{1R}$ and $M_{2R}$ (which are 3% of the size of $M_1$ and $M_2$)(generally size is dependent on the specific design of the converter and how much charge-recycling is needed; 0.01% to 20% represents a practical acceptable range), 60-80% recycling efficiency is available with $L_R$ ranging from 1-10 nH as a result of relatively low losses in the charge recycling loop. A trade-off is that increasing the inductor size too much can produce too slow rise/fall times in the value of $C_{GATE1,2}$, which leads to higher overlap losses in $M_1$ and $M_2$.

Figure 3C:
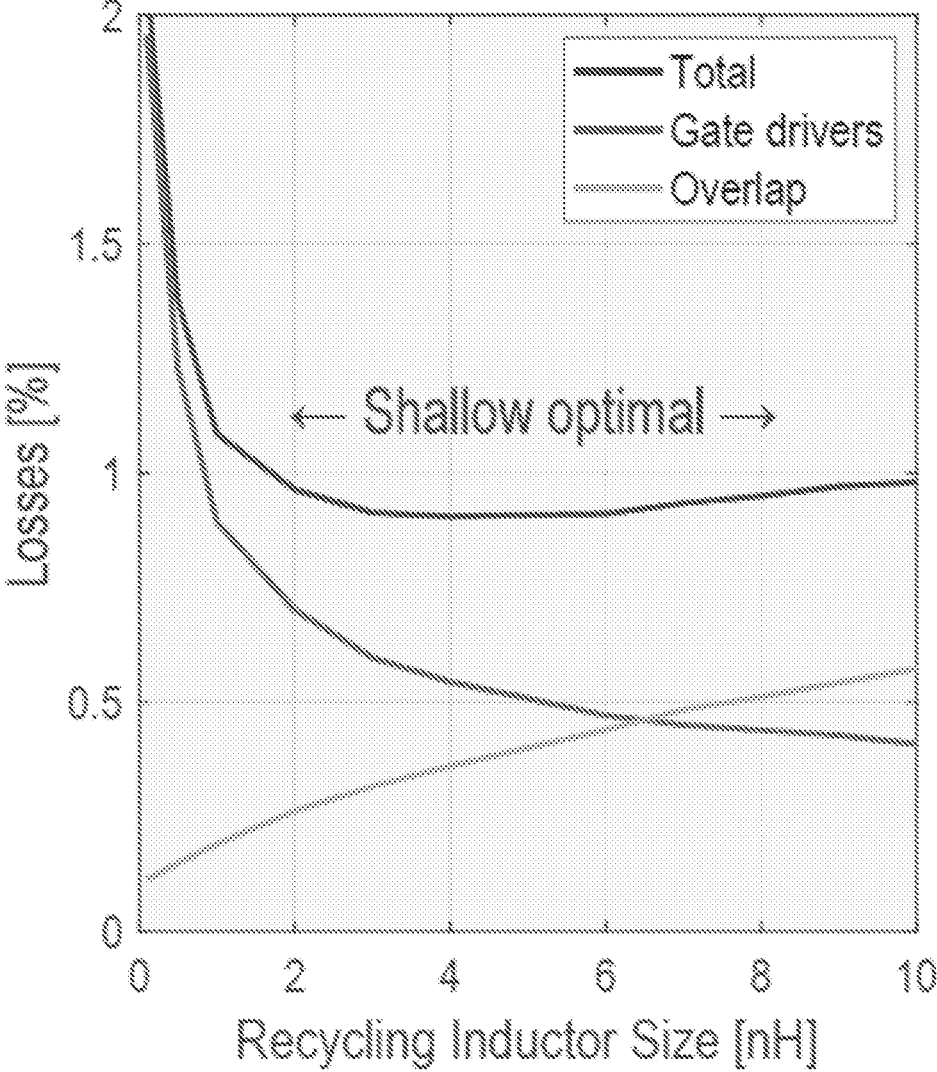
FIG. 3C illustrates trade-offs between gate driver losses and V-I overlap losses for a representative light load current showing a shallow optimum.

FIG. 3C illustrates trade-offs between gate driver losses and V-I overlap losses for a representative light load current showing a shallow optimum. When combining the overlap losses with the gate drive losses (while charge recycling is applied) the total losses will have a shallow optimum illustrating reduced overall losses (even when overlap losses are increasing with the recycling inductor size). At higher load currents, partial charge recycling can be applied by reducing the pulse duration of the charge recycling signals. This minimum duration is consistent with the goal of minimum rise/fall time for gate signals to prevent ringing at the switching nodes.

Figure 4A:
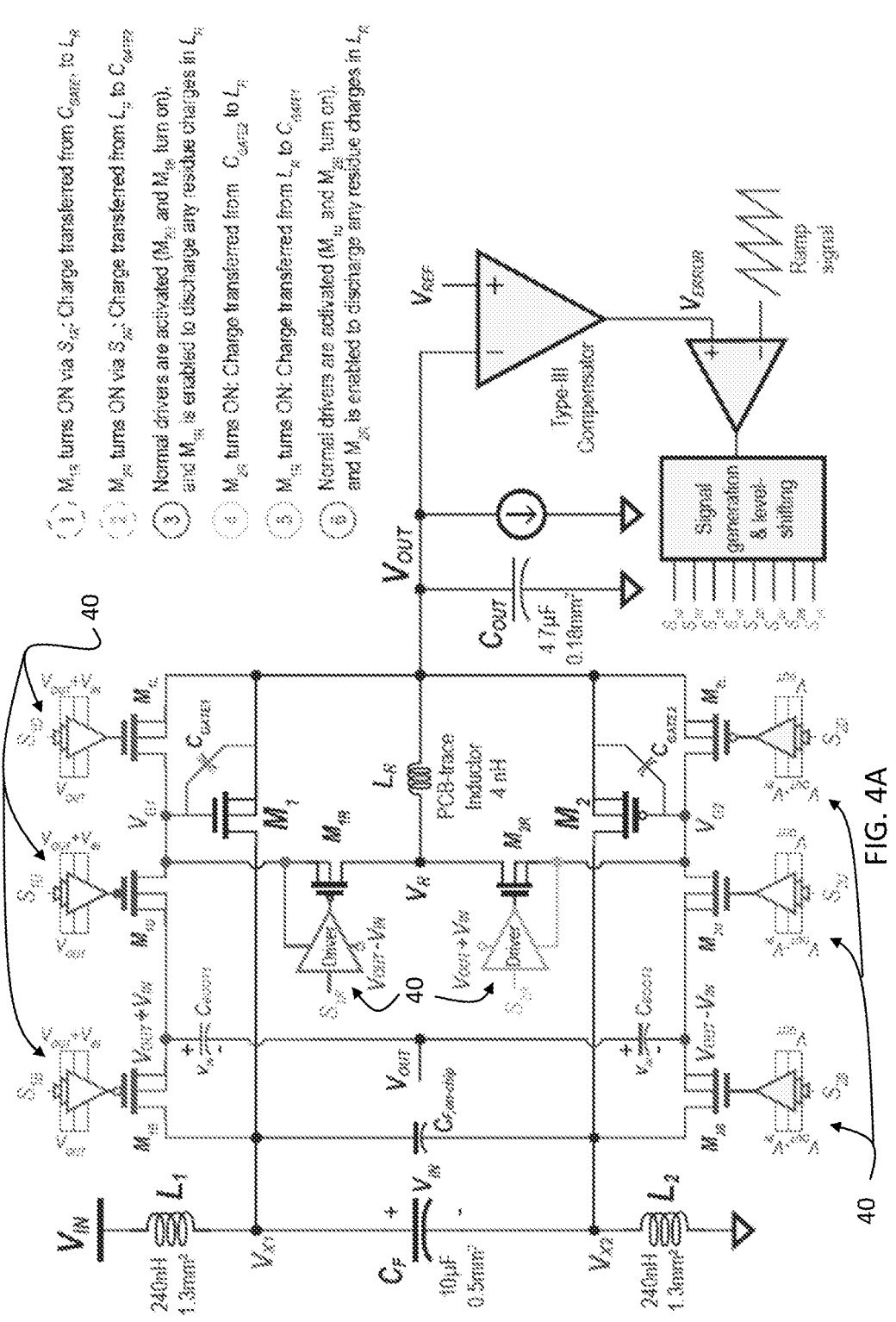
FIG. 4A is a detailed schematic circuit diagram of a preferred charge-recycling inductor-first buck converter with exemplary component sizes.

FIG. 4A is a detailed schematic circuit diagram of a preferred charge-recycling inductor-first buck converter with exemplary component sizes. Small-size passive components were used for the power inductors and capacitors. The charge recycling inductor was implemented via a PCT trace. The circuit includes a closed-loop controller with a type-III compensator to generate a PWM signal. The PWM signal was used to generate all eight control signals for eight drivers 40.

Figure 4B:
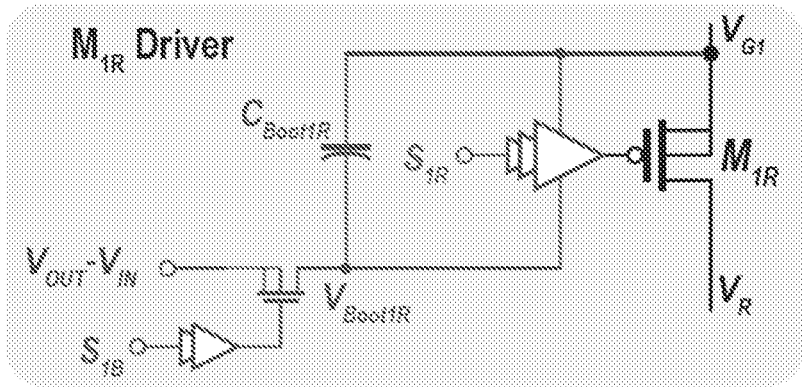
FIGS. 4B and 4C show a preferred implementation of the charge recycling drivers in FIG. 4A.
Figure 4C:
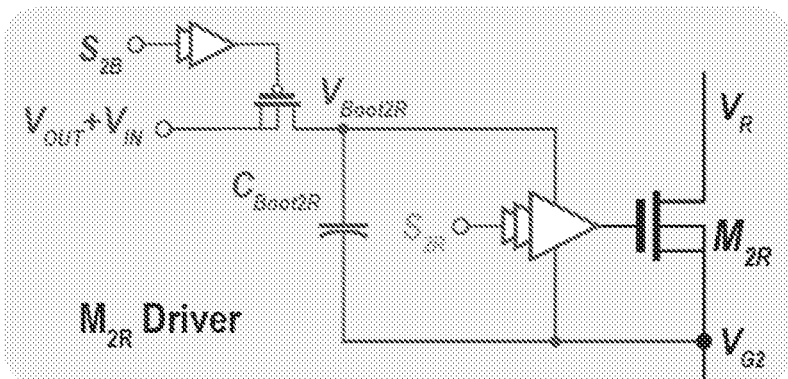

FIGS. 4B and 4C show a preferred implementation of the charge recycling drivers in FIG. 4A. Driving the charge recycling MOSFETS $M_{1R}$ and $M_{2R}$ can be challenging due to the varying voltage are their source and drain terminals. When $M_{1R}$ is activated to charge/discharge $C_{GATE1}$, it needs to bypass a voltage that varies between $V_{OUT}$ and ($V_{OUT}$+ $V_{IN}$), which is a voltage swing of $V_{IN}$. When $M_{2R}$ is activated to charge/discharge $C_{GATE2}$, it needs to bypass a voltage that varies between $V_{OUT}$ and ($V_{OUT}-V_{IN}$), which is a voltage swing of $V_{IN}$. $M_{1R}$ and $M_{2R}$ need to bypass these varying voltages while minimizing their on-resistance to minimize losses in the recycling loop. As seen in FIGS. 4B and 4C, preferred divers include local bootstrapping capacitors $C_{Boot1R}$ and $C_{Boot2R}$ connected to the gate terminals of their respective power MOSFETS $V_{G1}$ and $V_{G2}$ to generate appropriate internal flying rails.

These drivers provide several benefits. One is that the CR MOSFETs can be implemented using the low-voltage 1.8 V MOSFETS, while bypassing large varying voltages. Another is that the CR MOSFETs are always driven with the maximum overdrive voltage of $V_{IN}$, which minimizes losses in the recycling loop even when bypassing a varying voltage with a $V_{IN}$ swing. $V_{IN}$ is the main input voltage to the converter. $V_{IN}$ is also the overdrive voltage (the gate-to-source voltage) that is used to drive the CR MOSFETs. An additional advantage is that the CR MOSFETs are driven from internal converter internal nodes with no need for external supplies to drive them.

Figure 5A:
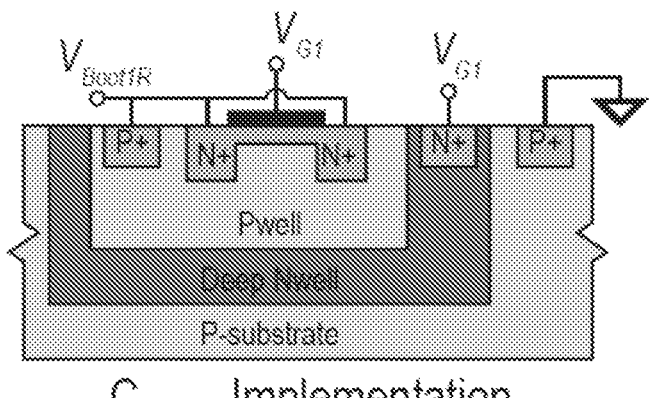
FIGS. 5A and 5B are schematic cross-sectional views of the preferred bootstrapping capacitors implemented in deep N-well technology.
Figure 5B:
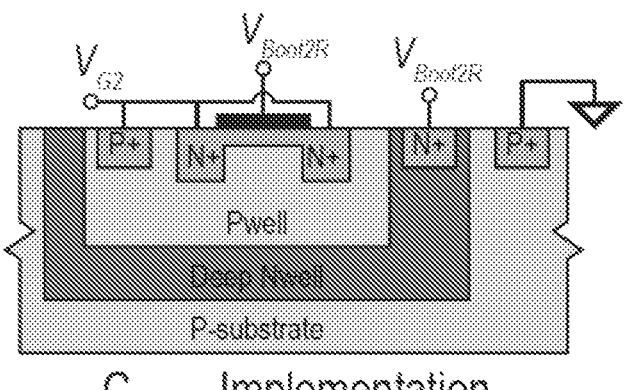

FIGS. 5A and 5B are schematic cross-sectional views of the preferred bootstrapping capacitors implemented in deep N-well technology. By implementing the capacitors in deep N-well technology, their negative terminals can be freely connected to voltages that different from the chip bulk voltage.

Figure 6A:
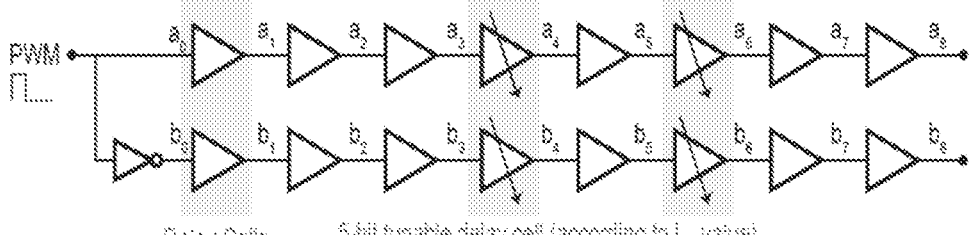
FIGS. 6A-6C respectively show a tunable delay line for PWM control signals, a recycling driver control circuit and a normal driver control circuit.
Figure 6B:
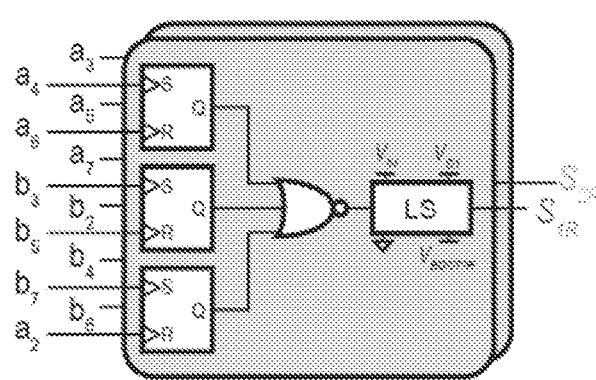
Figure 6C:
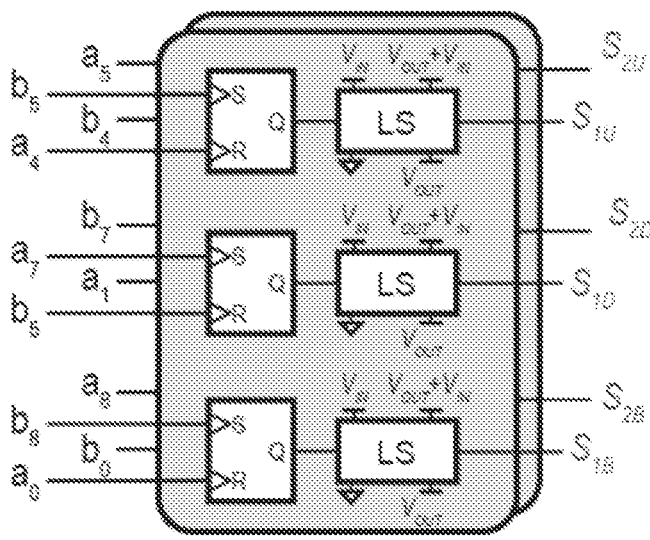
Figure 6D:
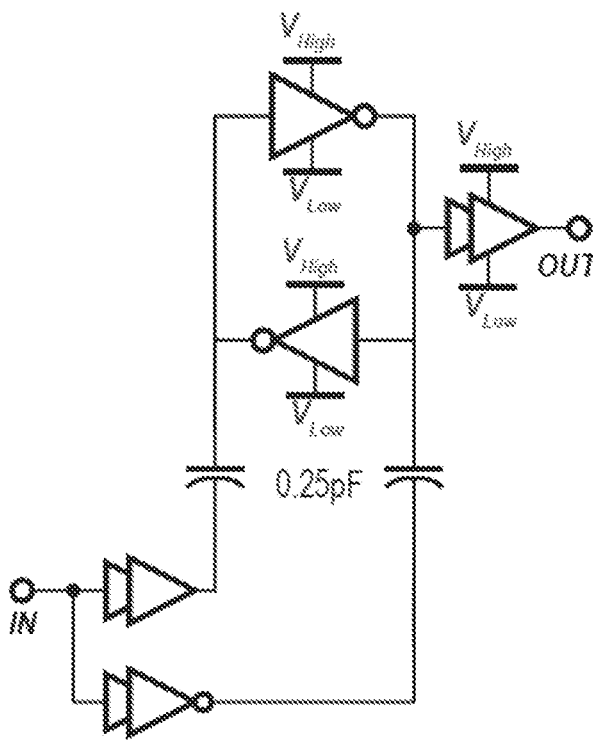
FIG. 6D shows a level shifter used for all of the control signals in the driver control circuits.

FIGS. 6A-6C respectively show a tunable delay line for PWM control signals, a recycling driver control circuit and a normal driver control circuit. The two PWM-input delay lines in FIG. 6A provide delayed version of the PWM signal as triggers for the SR registers in the drivers of FIGS. 6B and 6C. Some of the delay cells are tunable to control the duration of charge recycling pulses to best suit the value employed for $L_R$. FIG. 6D shows a level shifter used for all of the control signals such that $V_{HIGH}$ and $V_{LOW}$ are always connected to the converter internal nodes. The eight control signals are level-shifted by capacitively coupling into the flying-domain latches. $V_{HIGH}$ and $V_{LOW}$ are self-generated from converter internal nodes without need for any additional external supply.

The preferred circuit of FIGS. 4A-6D was fabricated as a PMIC in 180 nm CMOS with a total area of 4.6 mm². The PMIC was flip-chip bonded to an interposer where the passives ($C_F$=10 μF, $L_{1,2}$-240 nH, $C_{OUT}$-4.7 μF) were mounted on the backside. The total converter area, including all routing and the 4 nH PCB—trace recycling inductor occupied 5.7 mm².

When switched at 3 MHz, measurement results of efficiency versus load current revealed peak efficiencies of 98.2%, 95%, and 89.2% for $V_{OUT}$=1.5, 1, and 0.5 V, respectively. The converter had a high peak power density of 0.72 W/mm² (or 0.4 W/mm³) achieved at an efficiency of 91.8%. The charge recycling enabled a high measured peak efficiency of 88.4% even at only 1% of the maximum load current. A peak efficiency of 95% was achieved at output voltage of 1V and at 89% at an output voltage as low as 0.5V. Due to the charge recycling, efficiency is improved over a wide range of load currents, especially at light load currents with a demonstrated 88.4% efficiency even at 1% of maximum load current.

Figure 7:
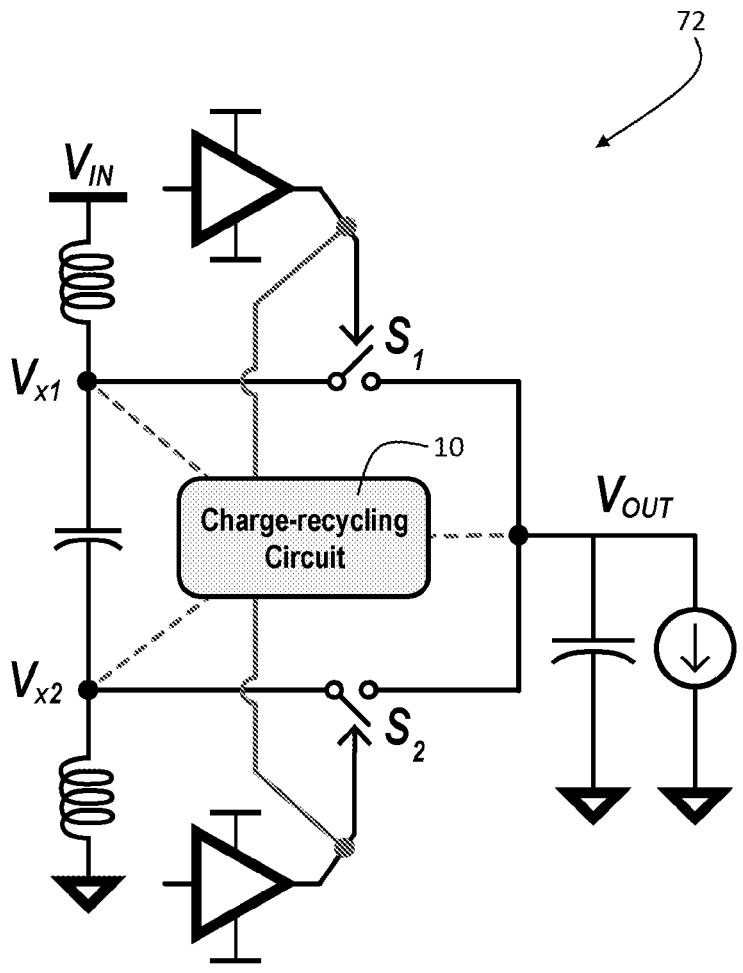
FIG. 7 shows a block diagram of the charge recycling technique applied to an inductor-first buck converter.
Figure 9C:
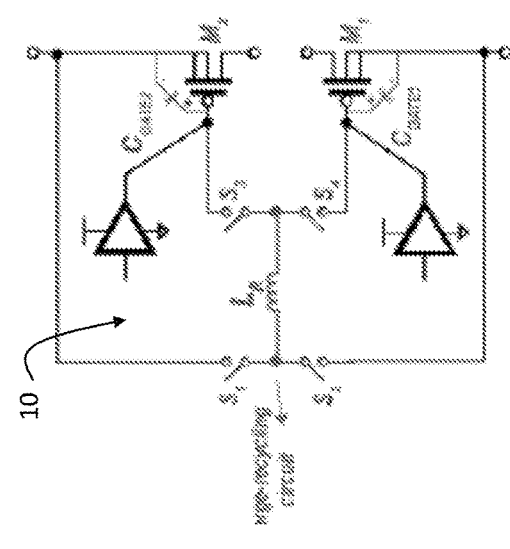
FIGS. 9A-9C show the present charge recycling circuit applied to two power MOSFETS in DC-DC converters of any topology.
Figure 9B:
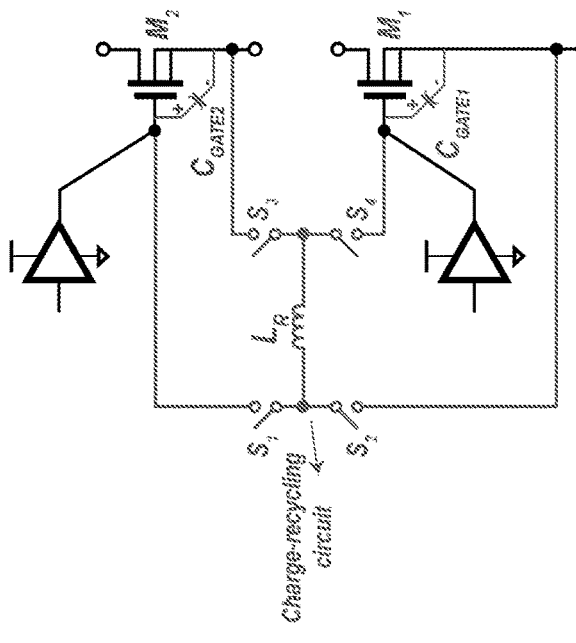
Figure 9A:
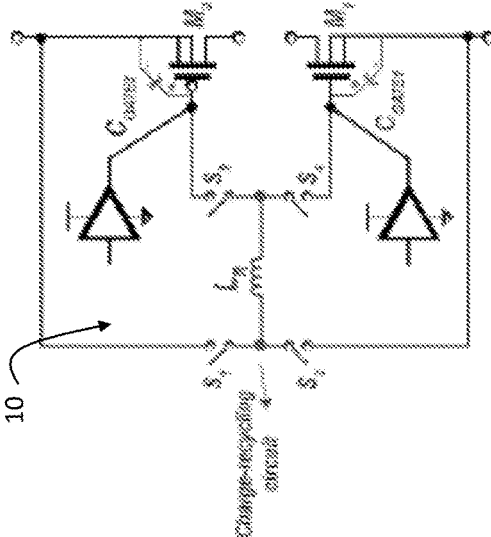

FIG. 7 shows a block diagram of the charge recycling technique applied to an inductor-first buck converter 72. The charge-recycling circuit 10 is constructed as in FIG. 1 or FIGS. 9A-9C and consists of a single inductor and switches that perform a direct charge recycling process for the gate charges of switches $S_1$ and $S_2$. The FIG. 1 example for the charge-recycling circuit construction applies when $S_1$ is NMOS and $S_2$ is PMOS. It can have a different configuration depending on $S_1$ and $S_2$ type as illustrated in FIGS. 9A-9C. The charge recycling circuit 10 is connected to the gate terminals of $S_1$ and $S_2$. In addition, the charge-recycling circuit 10 can also be coupled to $V_{X1}$, $V_{X2}$ and/or $V_{OUT}$ nodes depending on whether $S_1$ and $S_2$ are implemented as NMOS or PMOS. If $S_1$ is implemented as an NMOS, the charge recycling circuit 10 is coupled to $V_{OUT}$ and if $S_1$ is implemented as a PMOS, it will be coupled to $V_{X1}$. If $S_2$ is implemented as a PMOS, the charge recycling circuit 10 will be coupled to $V_{OUT}$ and if $S_2$ is implemented as an NMOS, it will be coupled to $V_{X2}$.

FIGS. 8A-8C show the present charge recycling circuit 10 applied to a buck converter 82. The high-side switch implemented as either a PMOS (FIG. 8A) or an NMOS (FIG. 8B). In both cases, when one power MOSFET is turning off, its gate capacitance charges are transferred to $L_R$ by directly connecting $L_R$ across its gate capacitance. These charges stored in $L_R$ are then transferred directly to the gate capacitance of the other power MOSFET to turn it on by directly connecting $L_R$ across the gate capacitance of the other power MOSFET.

FIGS. 9A-9C show the present charge recycling circuit 10 applied to two power MOSFETS in DC-DC converters of any topology. In FIG. 9A, the charge recycling circuit 10 is applied to power MOSFETS when one is PMOS and the other is NMOS. FIG. 9B, the charge recycling circuit 10 is applied to power MOSFETS when both are NMOS. In FIG. 9C, the charge recycling circuit 10 is applied to power MOSFETS when both are NMOS.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A charge recycling circuit in an integrated circuit DC-DC converter having two power MOSFETs, the charge recycling circuit comprising a single inductor and recycling MOSFET switches arranged and sized such that when one of the two power MOSFETs is turning off, gate capacitance charges of the one of the two power MOSFETS are transferred to the single inductor, stored in the single inductor and then transferred directly to the gate of the other power MOSFET to turn it on.

2. The charge recycling circuit of claim 1, wherein the inductor consists of a small PCB-trace charge recycling inductor.

3. The charge recycling circuit of claim 1, wherein the single inductor and recycling MOSFET switches are connected solely to internal nodes of the inductive DC-DC converter.

4. The charge recycling circuit of claim 3, wherein the single inductor is connected between an output node of the two power MOSFETs and between the recycling MOSFET switches, and the recycling MOSFET switches are connected to gates of the two power MOSFETs.

5. The charge recycling circuit of claim 1, wherein each of the recycling MOSFET switches charges the inductor via gate charge on an associated one of the power MOSFETs until its gate charge is fully depleted.

6. The charge recycling circuit of claim 5, wherein after the one of the power MOSFETs gate charge is fully depleted, the other of the recycling MOSFET switches asserts energy stored in the inductor to the other of the two power MOSFETs.

7. An inductive DC-DC converter including the charge recycling circuit of claim 5, comprising internal bootstrapping capacitors that internally generate two level-shifted rail voltages $V_{OUT}+V_{IN}$ and $V_{OUT}-V_{IN}$ that are used to drive the two power MOSFETs, which turn ON by connecting their gate terminals to the internal bootstrapping capacitors through connection transistors.

8. The converter of claim 7, wherein the two power MOSFETs dump their gate charges to a $V_{OUT}$ node through a load switch and the through connection transistors.

9. The charge recycling circuit of claim 1, wherein one of the recycling MOSFETs is implemented in PMOS and the other in NMOS.

10. The charge recycling circuit of claim 1, comprising drivers for the recycling MOSFET switches, the drivers comprising local bootstrapping capacitors connected to the gate terminals of respective power MOSFETS to generate internal flying rail voltage for recycling MOSFET switches.

11. The charge recycling circuit of claim 10, wherein the drivers ensure that the recycling MOSFET are always driven with a maximum level of the input drive voltage of the converter.

12. The charge recycling circuit of claim 10, comprising a tunable delay line generating delayed versions of a control signal that are provided to the drivers for use in controlling timing of charge recycling cycles.

13. The charge recycling circuit of claim 12, wherein the charge recycling cycles are interspersed with conversion cycles of the converter.

14. The charge recycling circuit of claim 1, wherein the converter is a inductor-first $3^{rd}$ order buck converter and the recycling MOSFET switches consist of two MOSFET switches connected to gates of the two power MOSFETs, with the single inductor being connected between the recycling MOSFET switches and an output of the converter.

15. A method for charge recycling in a DC-DC converter including two power MOSFETs connected to a converter output, the method comprising:

transferring gate capacitance charges from one of the two power MOSFETs when it is turning off to an inductor;

when the gate capacitance charges of the one of the two power MOSFETs is depleted, transferring charge stored in the inductor to the gate of the other power MOSFET to turn it on; and reversing the charge transfer through the inductor when the other power MOSFET is turning off, wherein the charge transfers through the inductor are interspersed with normal operations of the converter to convert a DC input voltage to a DC output voltage.

16. The method of claim 15, wherein the transferring of charges is controlled by recycling switches.

17. The method of claim 16, wherein the recycling switches are driven by internal node voltages of the converter.

* * * * *